US008425069B2

(12) United States Patent
Yamamoto et al.

(10) Patent No.: US 8,425,069 B2
(45) Date of Patent: Apr. 23, 2013

(54) LIGHTING DEVICE, DISPLAY DEVICE AND TELEVISION RECEIVER

(75) Inventors: Shuki Yamamoto, Osaka (JP); Yasumori Kuromizu, Osaka (JP); Kaori Yamamoto, Osaka (JP); Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 300 days.

(21) Appl. No.: 12/810,646

(22) PCT Filed: Dec. 10, 2008

(86) PCT No.: PCT/JP2008/072418
§ 371 (c)(1),
(2), (4) Date: Jun. 25, 2010

(87) PCT Pub. No.: WO2009/090811
PCT Pub. Date: Jul. 23, 2009

(65) Prior Publication Data
US 2010/0283905 A1    Nov. 11, 2010

(30) Foreign Application Priority Data
Jan. 15, 2008  (JP) .................................. 2008-006280

(51) Int. Cl.
*G09F 13/04* (2006.01)
*G09F 13/08* (2006.01)

(52) U.S. Cl.
USPC .............. 362/97.2; 362/217.09; 362/328; 362/339; 362/607

(58) Field of Classification Search ............... 362/97.1, 362/97.2, 97.4, 217.05, 217.07, 217.09, 224, 362/328, 330, 331, 339, 606, 607, 308
See application file for complete search history.

(56) References Cited

U.S. PATENT DOCUMENTS

| 6,100,952 | A | 8/2000 | Marvin et al. |
| 7,726,826 | B2 * | 6/2010 | Kusano et al. ............... 362/97.1 |
| 7,859,611 | B2 * | 12/2010 | Jang et al. .................... 349/64 |
| 7,967,461 | B2 * | 6/2011 | Bang et al. ................... 362/97.1 |

(Continued)

FOREIGN PATENT DOCUMENTS

| EP | 1 790 905 A1 | 5/2007 |
| EP | 1 942 370 A1 | 7/2008 |

(Continued)

OTHER PUBLICATIONS

Official Communication issued in corresponding European Patent Application No. 08871047.0, mailed on Dec. 17, 2010.

(Continued)

*Primary Examiner* — John A Ward
(74) *Attorney, Agent, or Firm* — Keating & Bennett, LLP

(57) ABSTRACT

A lighting device 12 of the present invention includes a plurality of light sources 17 and an optical member arranged closer to the light-exiting portion 15z than the light sources 17. The optical member 15 includes a prism diffuser plate 15a for diffusing light emitted from the light sources 17 and exiting from a lens sheet 15c arranged closer to the light-exiting portion 15z than the prism diffuser plate 15a. The prism diffuser plate 15a has prisms on a surface located on a side closer to the light-exiting portion 15z. The lens sheet 15c has convex lenses 62 on a surface closer to the light-exiting portion 15z.

6 Claims, 17 Drawing Sheets

U.S. PATENT DOCUMENTS

| | | |
|---|---|---|
| 2007/0182883 A1 | 8/2007 | Chen et al. |
| 2007/0296688 A1 | 12/2007 | Nakamura et al. |
| 2008/0094845 A1 | 4/2008 | Kusano et al. |
| 2008/0137346 A1* | 6/2008 | Ohta et al. .................... 362/309 |
| 2008/0252812 A1* | 10/2008 | Ohta et al. ...................... 349/61 |
| 2009/0079899 A1* | 3/2009 | Ohta et al. ...................... 349/58 |
| 2009/0128738 A1 | 5/2009 | Matsumoto et al. |

FOREIGN PATENT DOCUMENTS

| | | |
|---|---|---|
| JP | 11-038207 A | 2/1999 |
| JP | 2000-182418 A | 6/2000 |
| JP | 2003-279978 A | 10/2003 |
| JP | 2006-208968 A | 8/2006 |
| JP | 2007-256493 A | 10/2007 |
| JP | 2007-265783 A | 10/2007 |
| JP | 2008-251182 A | 10/2008 |
| RU | 49641 U1 | 11/2005 |
| WO | 2007/049515 A1 | 5/2007 |

OTHER PUBLICATIONS

English Translation of Official Communication issued in corresponding Russian Patent Application No. 2010129042, mailed on Feb. 28, 2012.

Official Communication issued in International Patent Application No. PCT/JP2008/072418, mailed on Feb. 3, 2009.

* cited by examiner

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal display panel used in a liquid crystal display device such as a liquid crystal television receiver does not emit light itself. Therefore, a backlight device is required as a separate lighting device. Such a backlight device is arranged behind the liquid crystal display panel (i.e., on an opposite side from a display surface). A backlight device including a plurality of linear light sources and a diffuser plate arranged on a side to which light emitted from the linear light sources is directed is known (see Patent Document 1).
Patent Document 1: Japanese Published Patent Application No. 2006-208968

Problem to be Solved by the Invention

In Patent Document 1, a convex lenticular lens is arranged on one surface of a practically transparent substrate as a diffuser plate. On another surface of the substrate, a diffusing layer having high light transmission rate is formed. The lenticular lens and substrate are prepared such that an overall light transmission rate is equal to or higher than 70%. With this configuration, the overall light transmission rate is improved while shadows of lamps are reduced. However, a reduction of lamp shadows at higher level is needed. Especially for providing a very thin display device, a backlight device should be arranged as close as possible to a display panels and thus the reduction of lamp shadows is a top-priority issue.

DISCLOSURE OF THE PRESENT INVENTION

The present invention was made in view of the foregoing circumstances. An object of the present invention is to provide a lighting device that provides illumination without noticeable light source shadows even when it is used closer to an object to be illuminated such as a liquid crystal display panel and thus it is suitable for use in very thin display devices. Another object of the present invention is to provide display device including such a lighting device and a television receiver including such a display device.

Means for Solving the Problem

To solve the above problems, a lighting device of the present invention having a light output portion from which light exits includes a plurality of light sources and an optical member arranged on the light output portion with respect to the light sources. The optical member includes a prism diffuser plate for diffusing light emitted from the light sources and exiting from a lens sheet arranged on the light output portion with respect to the prism diffuser plate. The prism diffuser plate has a prism on a surface located on the light output portion. The lens sheet has a convex lens on a surface located on the light output portion.

This lighting device can provide light with uniform in-plane luminance for an object to be illuminated without visible light source shadows. In the lighting device of the present invention, light emitted from the light sources is diffused by the prism diffuser plate and virtual images of the light sources are formed by the prism of the prism diffuser plate provided on the light output portion. As a result, shadows of the light sources are compensated. Furthermore, rays of the light exiting from the prism diffuser plate is separated or collected by the lens sheet having the convex lens on a light-exiting surface. As a result, the shadows of the light images are further compensated and light (for illumination) transmitting through the optical member and exiting therefrom is provided with decent uniform brightness without creating shadows of the light sources.

BEST MODE FOR CARRYING OUT THE INVENTION

First Embodiment

The first embodiment of the present invention will be explained with reference to figures.

Figure 1:
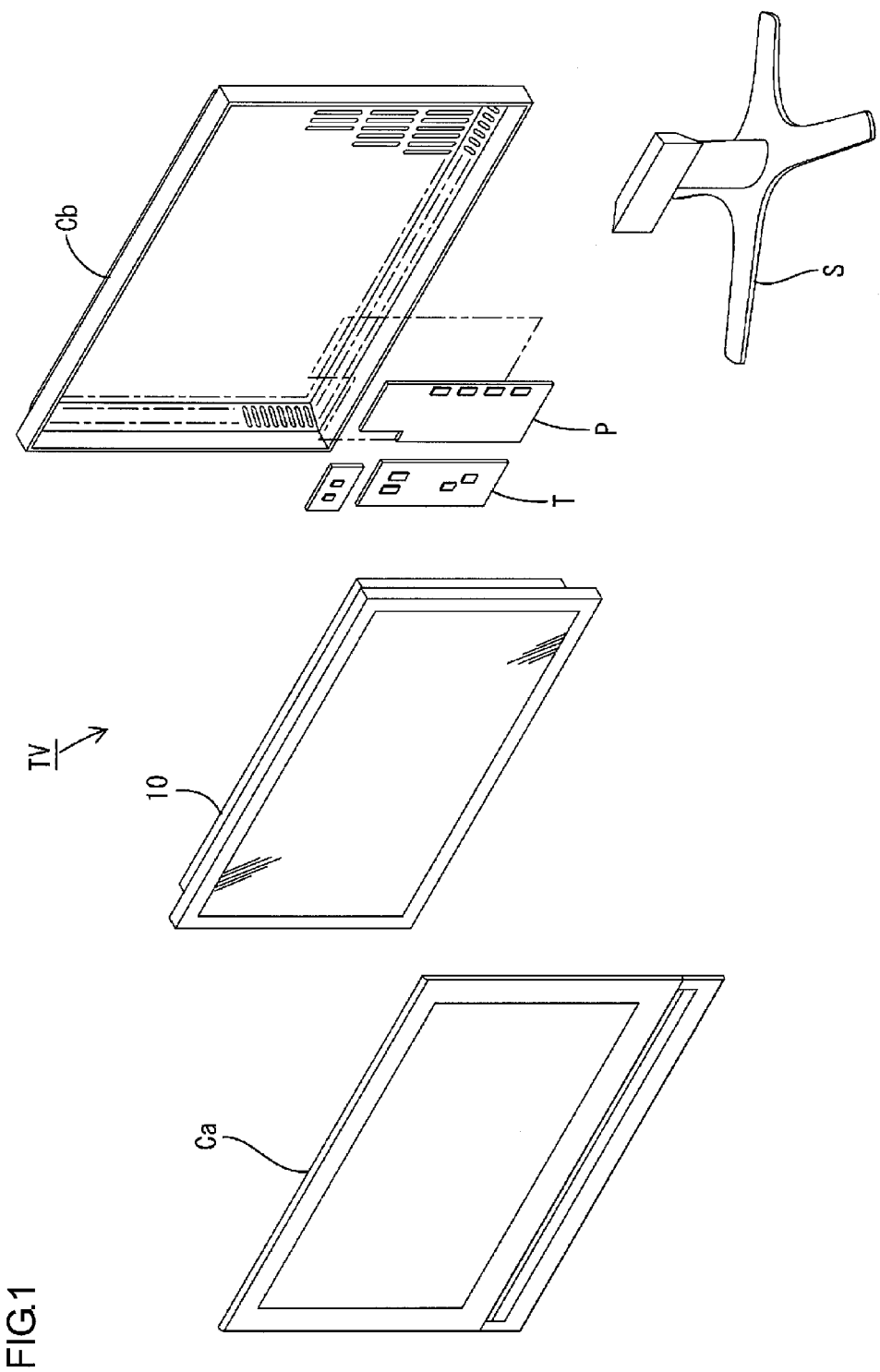
FIG. 1 is an exploded perspective view illustrating a general construction of a television receiver according to the first embodiment of the present invention.
Figure 2:
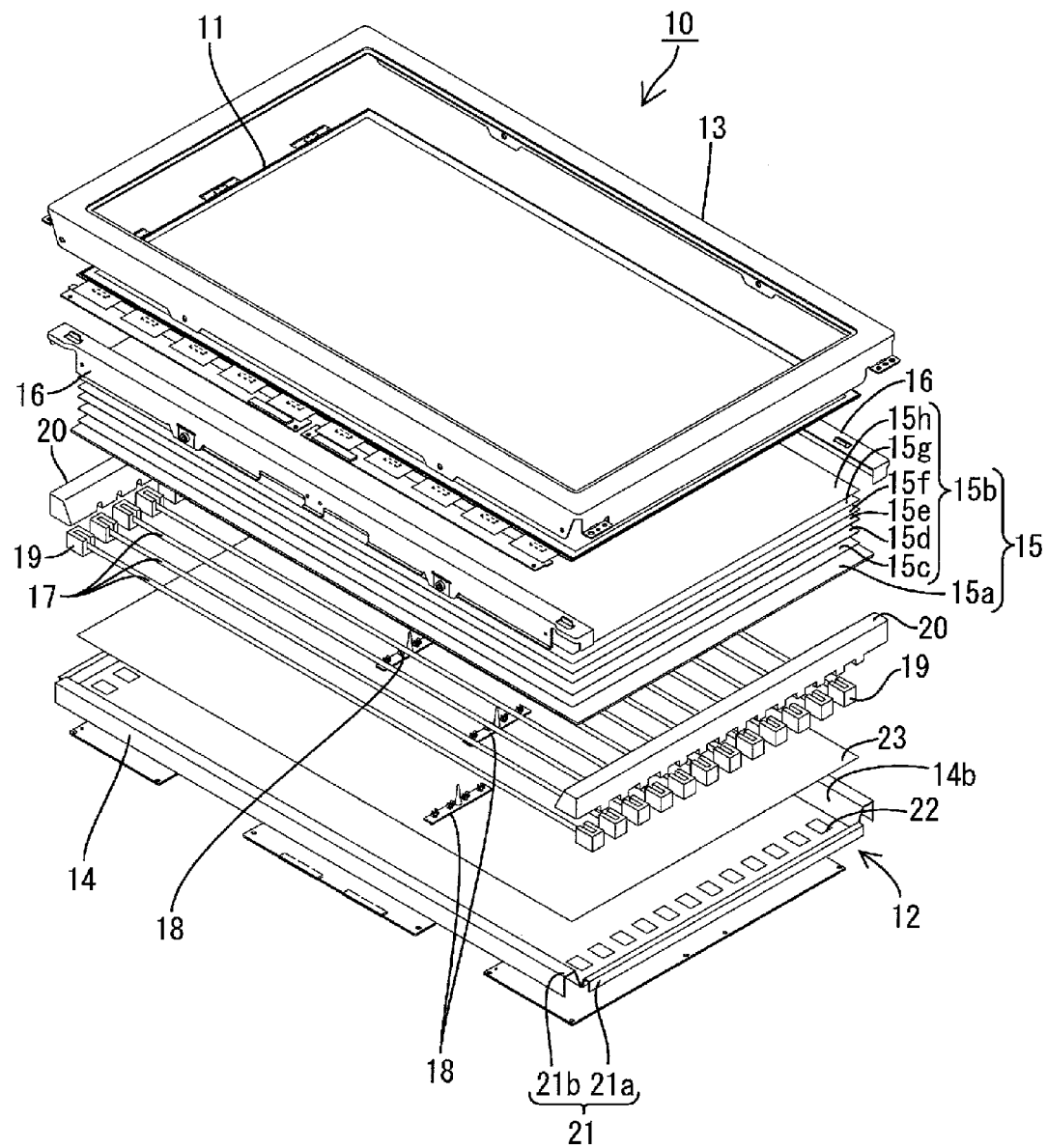
FIG. 2 is an exploded perspective view illustrating a general construction of a liquid crystal display device included in the television receiver in FIG. 1.
Figure 3:
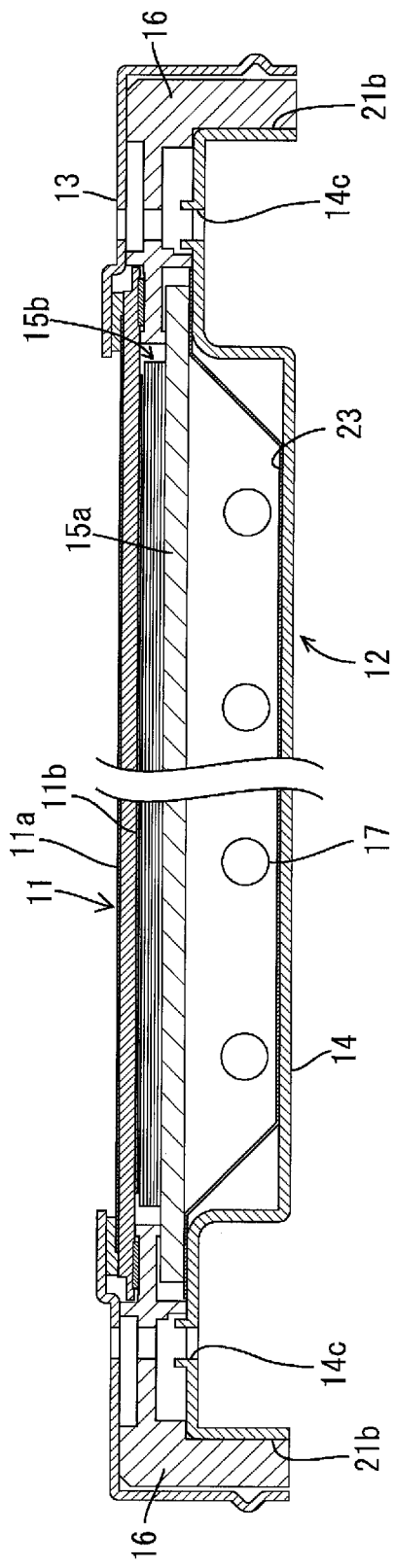
FIG. 3 is a cross-sectional view of the liquid crystal display device in FIG. 2 along the short-side direction.
Figure 4:
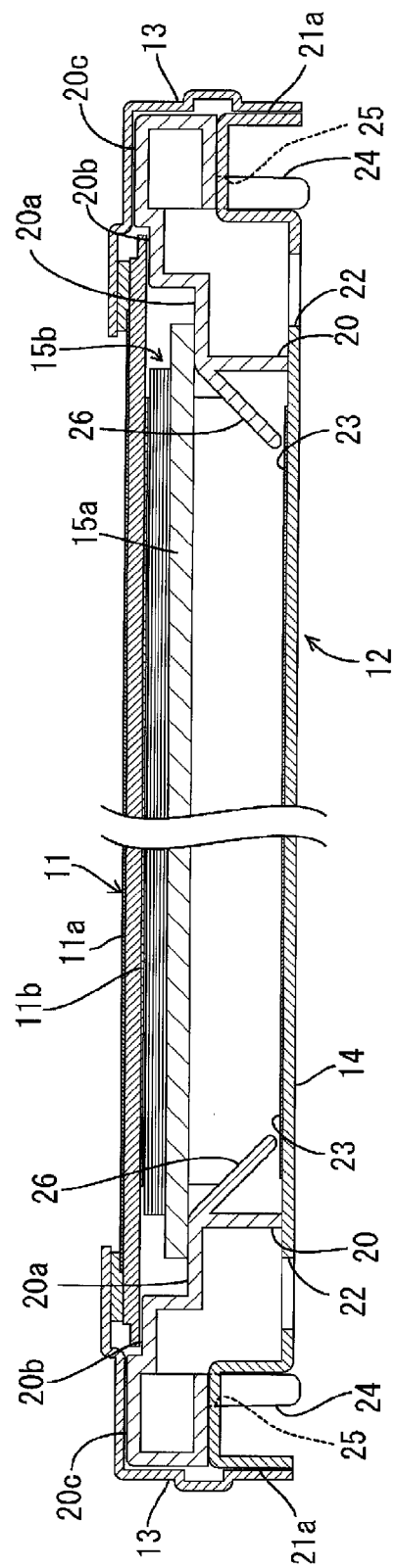
FIG. 4 is a cross-sectional view of the liquid crystal display device in FIG. 2 along the long-side direction.

FIG. 1 is an exploded perspective view illustrating a general construction of a television receiver of this embodiment. FIG. 2 is an exploded perspective view illustrating a general construction of a liquid crystal display device included in the television receiver in FIG. 1. FIG. 3 is a magnified cross-sectional view of apart of the liquid crystal display device in FIG. 2 along the short-side direction. FIG. 4 is a magnified cross-sectional view of apart of the liquid crystal display device in FIG. 2 along the long-side direction.

As illustrated in FIG. 1, the television receiver TV of the present embodiment includes the liquid crystal display device 10, front and rear cabinets CA, CB that house the liquid crystal display device 10 therebetween, a power source P, a tuner T and a stand S. An overall shape of the liquid crystal display device (display device) 10 is a landscape rectangular. As illustrated in FIG. 2, the liquid crystal display device 10 includes a liquid crystal panel 11 as a display panel, and a backlight device 12 (lighting device), which is an external light source. They are integrally held by a bezel 13 and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together via liquid crystal that is sealed in a space provided with a predetermined gap between the glass substrates. On one of the glass substrates, switching components (e.g., TFTs) connected to source lines and gate lines that are perpendicular to each other, pixel electrodes connected to the switching components, and an alignment film are provided. On the other substrate, counter electrodes, color filter having color sections such as R (red), G (green) and B (blue) color sections arranged in a predetermined pattern, and an alignment film are provided. Polarizing plates 11a, 11b are attached to outer surfaces of the substrates (see FIGS. 3 and 4).

As illustrated in FIG. 2, the backlight device 12 includes a chassis 14, an optical member 15 and frames 16. The chassis 14 has a substantially box-shape and an opening 14b on the light emitting side (on the liquid crystal panel 11 side). The optical member is arranged so as to cover the opening 14b of the chassis 14. The optical member includes a diffuser plate 15a arranged on a chassis 14 side. The frames 16 arranged along the long sides of the chassis 14 holds the long-side edges of the diffuser plate 15a to the chassis 14. The long-side edges of the diffuser plate 15a are sandwiched between the chassis 14 and the frames 16. Cold cathode tubes (light sources) 17, lamp clips 18, relay connectors 19 and lamp holders 20 are installed in the chassis 14. The lamp clips 18 are provided for mounting the cold cathode tube 17 to the chassis 14. The relay connectors are connected to ends of the cold cathode tubes 17 for making electrical connection. The lamp holders 20 collectively cover ends of the cold cathode tubes 17 and the relay connectors 19. In the backlight device 12, light is directed to a light output side, that is, to an area located on an optical member 15 side and more to the front than the cold cathode tubes 17. In this embodiment, a light output portion 15z is provided on a light output side of the optical member 15 (i.e., on a side closer to the liquid crystal panel 11) (see FIG. 5).

The chassis 14 is made of metal. It includes a rectangular bottom plate and outer rim portions 21, each of which extends upright from the corresponding side of the bottom plate and has a substantially U shape. The outer rim portions 21 include short-side outer rims 21a and long-side outer rims 21b provided at the short sides and the long sides of the chassis 14, respectively. The bottom plate has a plurality of mounting holes 22, which are through holes, along the long-side edges thereof for mounting the relay connectors 19. As illustrated in FIG. 3, fixing holes 14c are provided on the upper surface of the chassis 14 along the long-side outer rims 21b to bind the bezel 13, the frames 16 and the chassis 14 together with screws and the like.

A light reflecting sheet 23 is disposed on an inner surface of the bottom plate of the chassis 14 (on a side that faces the cold cathode tubes 17). The light reflecting sheet 23 is a synthetic resin sheet having a surface in white that provides high light reflectivity. It is placed so as to cover almost entire inner surface of the bottom plate of the chassis 14. As illustrated in FIG. 3, long-side edges of the light reflecting sheet 23 are lifted so as to cover the long-side outer rims 21b of the chassis 14 and sandwiched between the chassis 14 and the diffuser plate 15a. With this light reflecting sheet 23, light emitted from the cold cathode tubes 17 is reflected toward the optical member 15.

Each cold cathode tube 17 has an elongated tubular shape. A plurality of the cold cathode tubes 17 are housed in the chassis 14 such that they are arranged parallel to each other (i.e., in a parallel arrangement) with the long-side direction thereof (the axial direction) aligned with the long-side direction of the chassis 14 (see FIG. 2). Each cold cathode tube 17 is slightly separated from the bottom plate of the chassis 14 (or the light reflecting sheet 23), and ends thereof are fitted to the respective relay connectors 19. The holders 20 are mounted so as to cover the relay connectors 19.

The holders 20 that cover the ends of the cold cathode tubes 17 are made of white synthetic resin. Each of them has an elongated substantially box shape that extends along the short side of the chassis 14. As illustrated in FIG. 4, each holder 20 has steps on the front side such that the diffuser plate 15a and the liquid crystal panel 11 are held at different levels. A part of the holder 20 is placed on top of apart of the corresponding short-side outer rim 21a of the chassis 14 and forms a side wall of the backlight device 12 together with the short-side outer rim 21a. Insertion pins 24 project from a surface of the holder 20 that faces the outer rim 21a of the chassis 14. The holder 20 is mounted to the chassis 14 by inserting the insertion pins 24 into insertion holes 25 provided in the top surface of the short-side outer rim 21a of the chassis 14.

The steps of the holder 20 include three surfaces parallel to the bottom plate of the chassis 14. The short edge of the diffuser plate 15a is placed on the first surface 20a at the lowest level. A sloped cover 26 extends from the first surface 20a toward the bottom plate of the chassis 14. A short edge of the liquid crystal panel 11 is placed on the second surface 20b. The third surface 20c at the highest level is provided such that it overlaps the short-side outer rim 21a of the chassis 14 and comes in contact with the bezel 13.

The optical member 15 is configured to change characteristics of light emitted from the cold cathode tubes 17. The characteristics of light include an output angle and an in-plane luminance distribution. As illustrated in FIG. 2, the optical member 15 includes the diffuser plate 15a and an optical sheet set 15b. The optical sheet set 15b includes a lens sheet 15c, diffusing sheets 15d, 15e, 15f, 15g and a reflecting-type polarizing film 15h. The lens sheet 15c is arranged adjacent to the diffuser plate 15a and the rest of sheets 15d, 15e, 15f, 15g and the polarizing film 15h are layered on top of the lens sheet 15c in this order.

Figure 5:
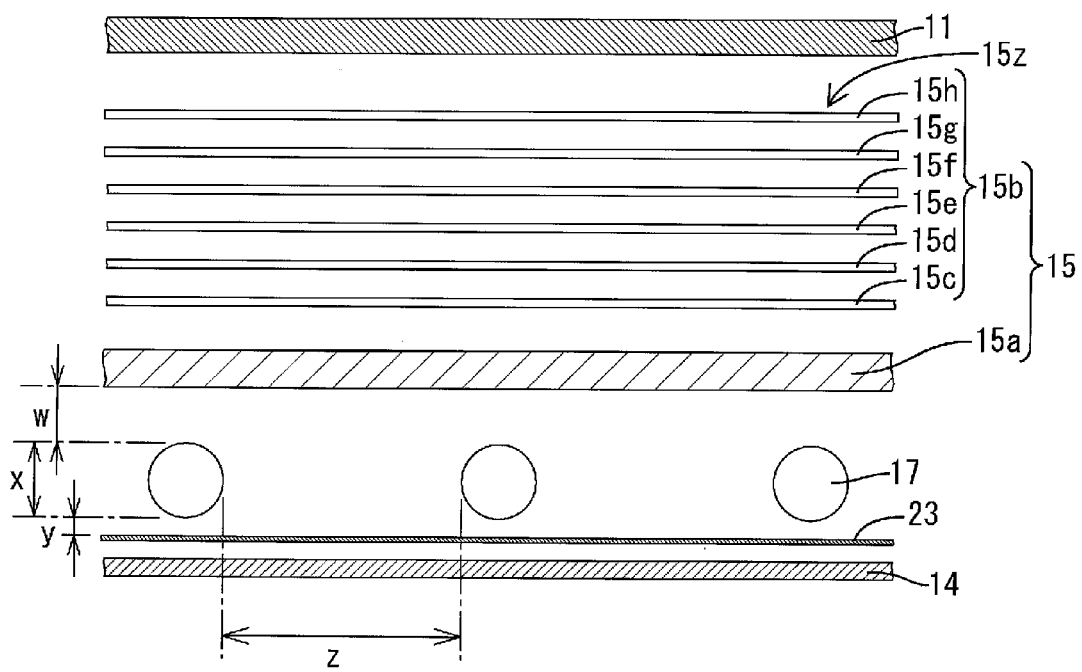
FIG. 5 is an explanatory view schematically illustrating a configuration of a backlight device.
Figure 6:
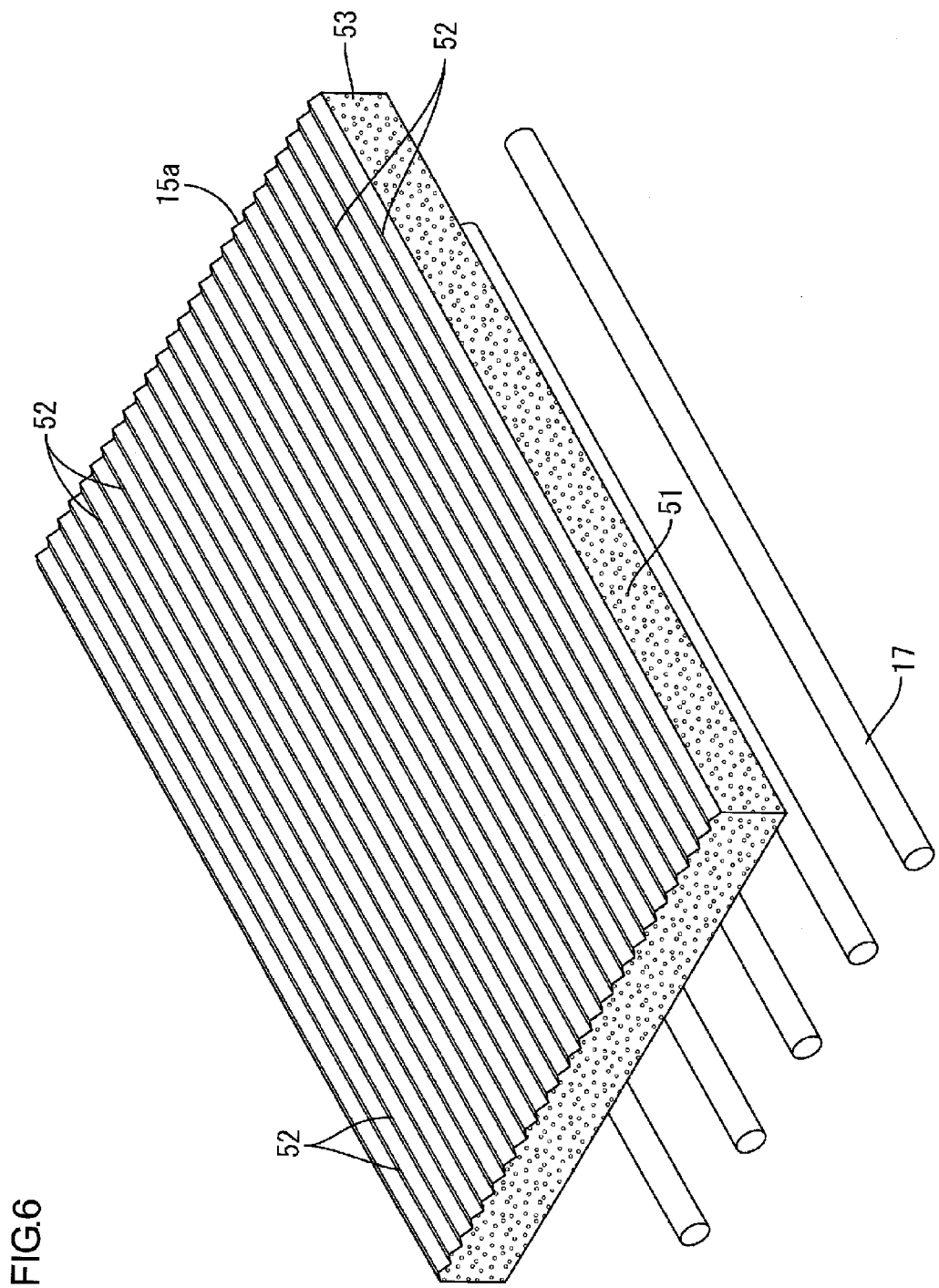
FIG. 6 is a perspective view illustrating a configuration of a diffuser plate.
Figure 7:
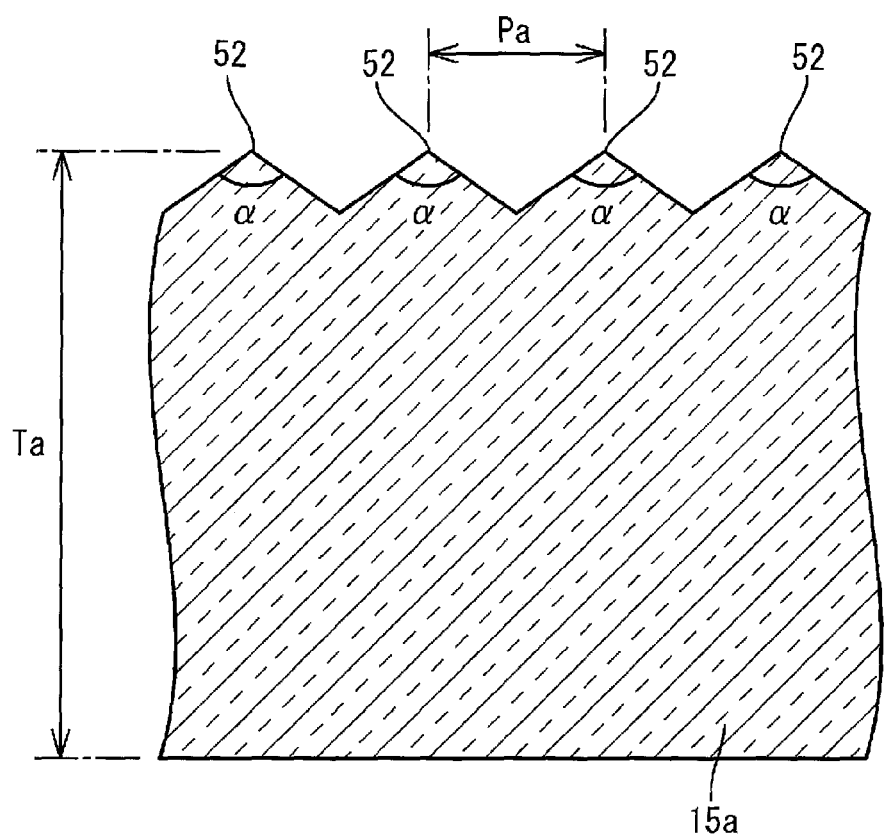
FIG. 7 is a magnified cross-sectional view of a part of the diffuser plate along the short-side direction.
Figure 8:
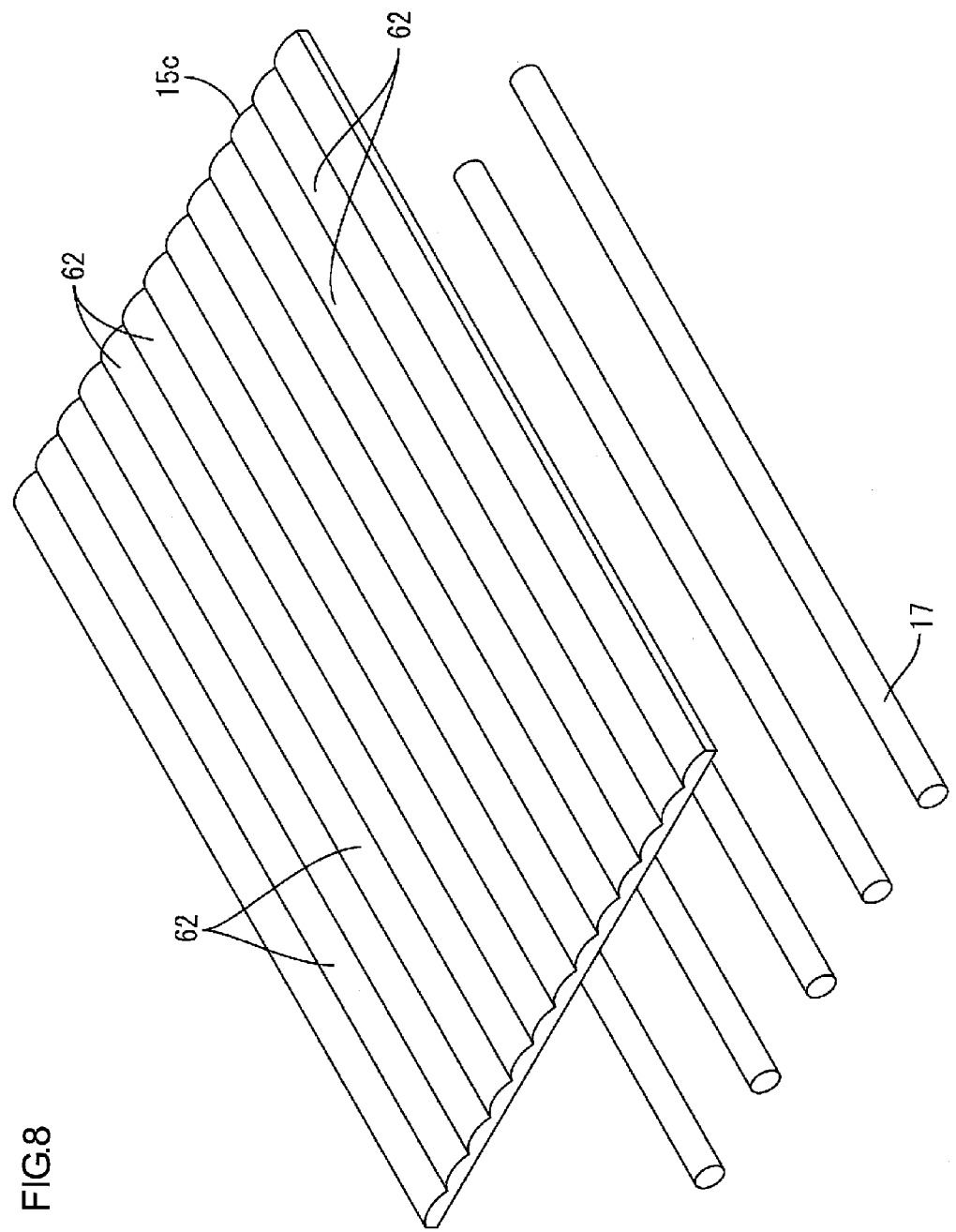
FIG. 8 is a perspective view illustrating a configuration of a lens sheet.
Figure 9:
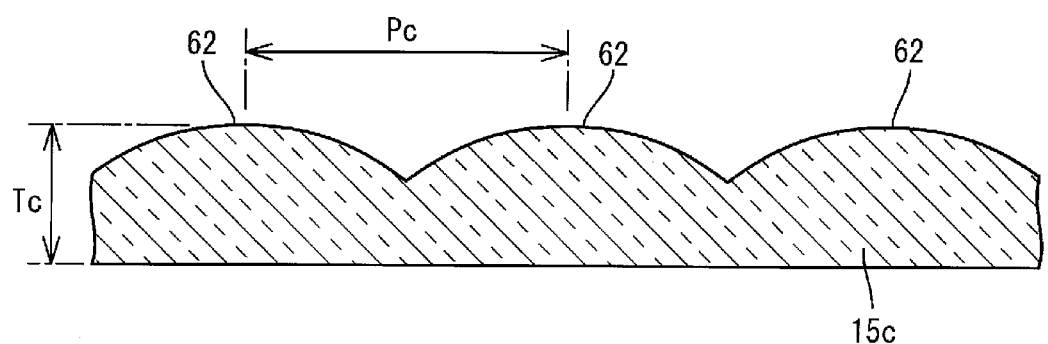
FIG. 9 is a magnified cross-sectional view of apart of the lens sheet along the short-side direction.
Figure 10:
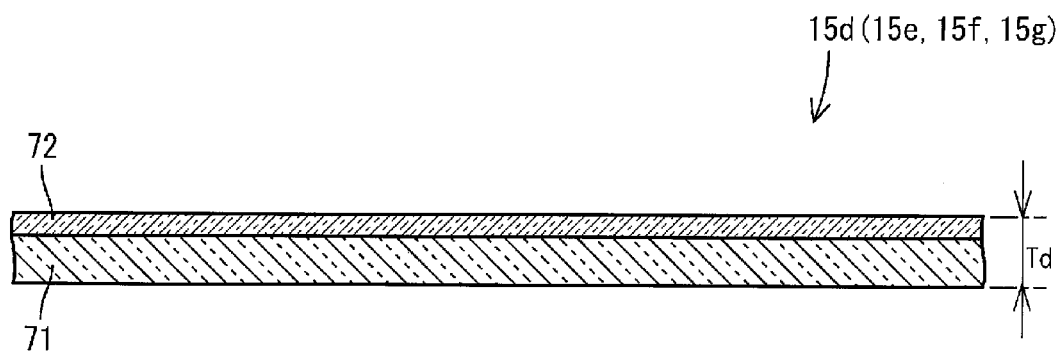
FIG. 10 is a cross-sectional view illustrating a configuration of a diffuser sheet.

Next, a configuration of the backlight device 12 will be explained in detail. FIG. 5 is an explanatory view schematically illustrating the configuration of the backlight device 12. FIG. 6 is a perspective view illustrating a configuration of the diffuser plate 15a included in the backlight device 12. FIG. 7 is a magnified cross-sectional view of apart of the diffuser plate 15a along the short-side direction. FIG. 8 is a perspective view illustrating a configuration of the lens sheet 15c. FIG. 9 is a magnified cross-sectional view of a part of the lens sheet 15c along the short-side direction. FIG. 10 is a cross-sectional view illustrating configurations of the diffuser sheets 15d, 15e, 15f, 15g.

As illustrated in FIG. 5, in the backlight device 12 of the present embodiment, the cold cathode tubes 17 are arranged parallel to each other in space between the light reflecting sheet 23 on the inner surface of the chassis 14 and the diffuser plate 15a of the optical member 15. The space is referred to as a light source holding area (i.e., light source holding space). In this embodiment, each cold cathode tube 17 having a diameter of 4.0 mm is arranged in the following settings: distance y=0.8 mm, distance z=16.4 mm and distance w=2.7 mm, where distance y is a distance between the cold cathode tube 17 and the light reflecting sheet 23, distance z is a distance between the adjacent cold cathode tubes 17 and distance w is a distance between the cold cathode tube 17 and the diffuser plate 15a. In this backlight device 12, distances between the components are defined so as to reduce the thickness of the backlight device 12. Especially, the distance between the cold cathode tubes 17 and the diffuser plate 15a and the distance between the cold cathode tubes 17 and the reflecting sheet 23 are reduced. Because of the thickness reduction of the lighting device 12, the liquid crystal display device 10 and the television receiver TV are provided with the following thicknesses. The thickness of the liquid crystal display device 10 (i.e., the thickness between the front surface of the liquid crystal panel 11 and the back surface of the backlight device 12) is 16 mm. The thickness of the television receiver TV (i.e., and the thickness between the front surface of the front cabinet Ca and the back surface of the rear cabinet Cb) is 34 mm. Namely, a thin television receiver is provided.

As illustrated in FIGS. 6 and 7, the diffuser plate 15a of the optical member 15 includes a synthetic resin plate in which light diffusing particles 51 are scattered. The diffuser plate 15a diffuses linear light emitted from the cold cathode tubes 17, which are liner light sources (tubular light sources). The short-side edges of the diffuser plate 15a are placed on the first surfaces 20a of the holder 20 as explained above. No force is applied to the edges to press them down. As illustrated in FIG. 3, the long-side edges of the diffuser plate 15a are sandwiched between the chassis 14 (or the light reflecting sheet 23) and the frame 16 so as to be held tightly.

Furthermore, elongated prisms 52 are arranged parallel to each other on the front surface of the diffuser plate (prism diffuser plate) 15a on the side from which light exits. The thickness Ta of the diffuser plate 15a is 2 mm. The interval Pa between vertexes of the prisms 52 is 0.07 mm. A vertex angle α of each prism 52 is 110°±5° (production tolerance). An overall light transmission rate is 85%.

As illustrated in FIGS. 3 and 4, the optical sheet set 15b of the optical member 15 are sandwiched between the diffuser plate 15a and the liquid crystal panel 11. As explained above, the lens sheet 15c is arranged adjacent to the diffuser plate 15a on the light output side. The diffuser sheets 15d, 15e, 15f, 15g and the reflecting-type polarizing film 15h are layered on the lens sheet 15c.

As illustrated in FIGS. 8 and 9, the lens sheet 15c includes a transparent substrate made of synthetic resin and elongated convex lenses (concave cylindrical lenses or lenticular lenses) 62 arranged parallel to each other on the front surface (the light-exiting surface) of the substrate. The convex lenses 62 are arranged such that the longitudinal direction thereof is parallel to that of the cold cathode tubes 17. The thickness Tc of the lens sheet 15c is 0.5 mm and the interval Pc between the convex lenses 62 is 0.15 mm.

As illustrated in FIG. 10, each of the diffusing sheets 15d, 15e, 15f, 15g includes a transparent substrate 71 made of synthetic resin and a diffusing layer 72 in which light diffusing particles are scattered. The diffusing layer 72 is formed on the front surface of the substrate 71. The thickness Td of the diffusing sheets 15d, 15e, 15f, 15g is 0.22 mm. The thickness of the substrate 71 is 0.188 mm.

The polarizing film 15h passes a part of light exiting from the diffuser sheets 15d, 15e, 15f, 15g and reflects the rest parts of the light. The polarizing film 15h enhances the light use efficiency of the liquid crystal panel 11 for pixels. The reflected parts of light is reflected by the light reflecting sheet 23 and reused.

According to the television receiver TV of the present embodiment, the backlight device 12 included in the liquid crystal display device 10 includes the diffuser plate 15a and the lens sheet 15c having the above configurations as parts of the optical member 15. The shadows of the cold cathode tubes 17 (i.e., strip shadows) are less likely to be seen on the display screen and thus display with uniform in-plane luminance can be provided. In the backlight device 12, the light emitted from the cold cathode tubes 17 is diffused by the prism diffuser plate 15a and virtual images are created by the prisms 52 on the front surface of the prism diffuser plate 15a. As a result, the shadows of the cold cathode tubes 17 are compensated. Moreover, rays of the light that exit from the prism diffuser plate 15a are separated or collected by the lens sheet 15c having the convex lenses 62 on the light-exiting surface. As a result, the shadows of the cold cathode tubes 17 are further compensated.

Figure 12:
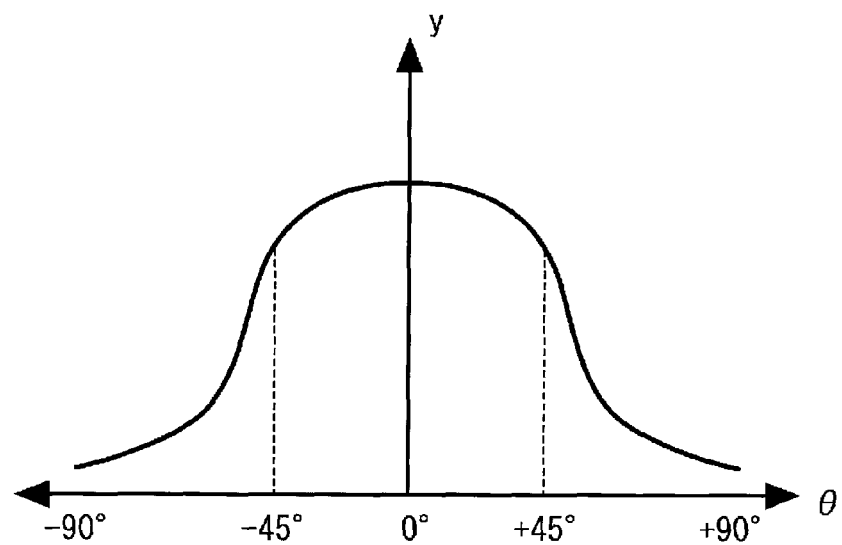
FIG. 12 is an explanatory view illustrating visual characteristics of the liquid crystal display panel.
Figure 13:
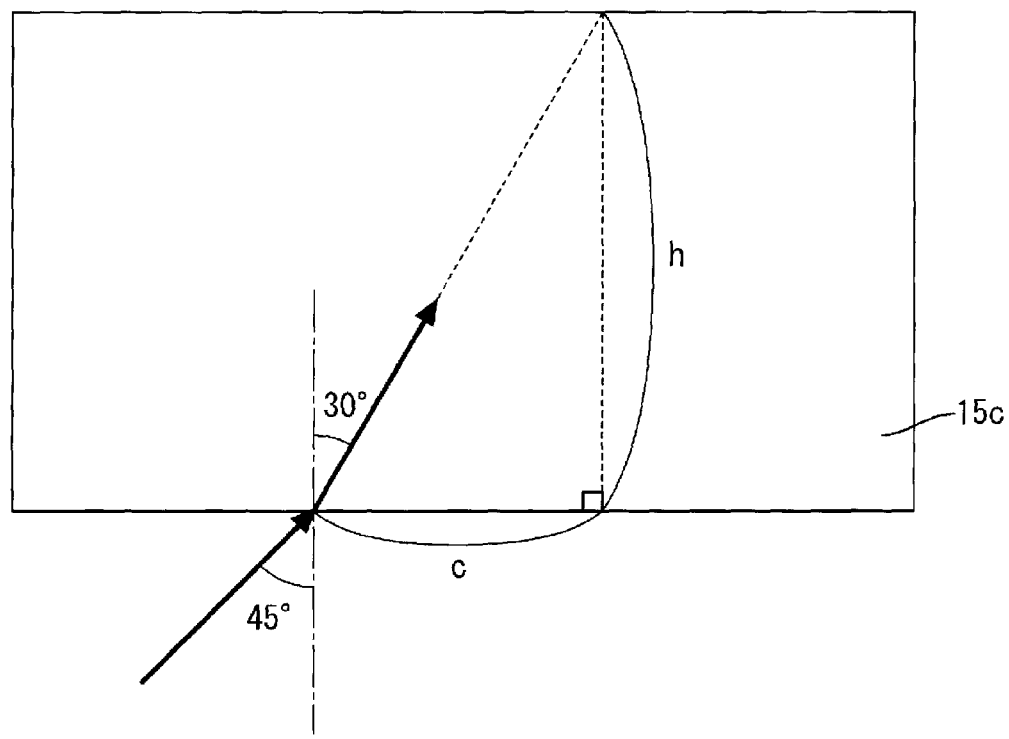
FIG. 13 is an explanatory chart illustrating the behavior of light entering the lens sheet and passing therethrough.

In the backlight device 12 of the present embodiment, the thickness of the diffuser plate 15a is larger than that of the lens sheet 15c. This is required for maintaining the effect of the virtual images created by the diffuser plate 15a to provide a good display quality with uniform brightness on the display surface of the liquid display device 10 having a very thin structure. To maintain the effect of the virtual images, a horizontal displacement c of a ray of the light from when it enters the lens sheet 15c to when it reaches the convex lenses 62 needs to be within ±10% of the distance z between the adjacent cold cathode tubes 17 (see FIG. 5). In this embodiment, the distance z is 16.4 mm and thus the allowable horizontal displacement c in the lens sheet 15c is ±1.64 mm. If the angle θ at which the ray of the light enters the lens sheet 15c is 45°, the thickness h of the lens sheet 15c should be equal to or smaller than the 2.84 mm. On the other hand, the lens sheet 15c requires a certain thickness for reliability, that is, protecting it from rumpling or bending. For example, the thickness of the lens sheet 15c needs to be 0.15 mm for a display size of 20 inches (diagonal) or over, and 0.18 mm for a display size of 40 inches (diagonal) or over. Namely, the thickness of the lens sheet 15c needs to be between 0.15 mm and 2.84 mm inclusive. In this embodiment, the thickness is 0.5 mm. The reason why 45° is used as the angle θ of the ray of the light entering the lens sheet 15c in the above description is because the luminance y of a ray of the light exiting from the diffuser plate 15a and the angle θ have a relationship as illustrated in FIG. 12. The luminance y is high when the angle θ is within a range between ±45°. To provide the display device with a decent display quality, rays of the light entering at an angle within the range of ±45° should be used. The ray of the light entering the lens sheet 15c is refracted toward the vertical direction by 30° due to a refraction index of this lens sheet 15c (see FIG. 13).

Second Embodiment

A television receiver of the second embodiment of the present invention will be explained. In the television receiver of this embodiment, the backlight device 12 includes a prism sheet 150c instead of the lens sheet 15c used in the first embodiment. Other configurations are the same as the television receiver of the first embodiment and explained with reference to the figures used for the description of the first embodiment.

Figure 11:
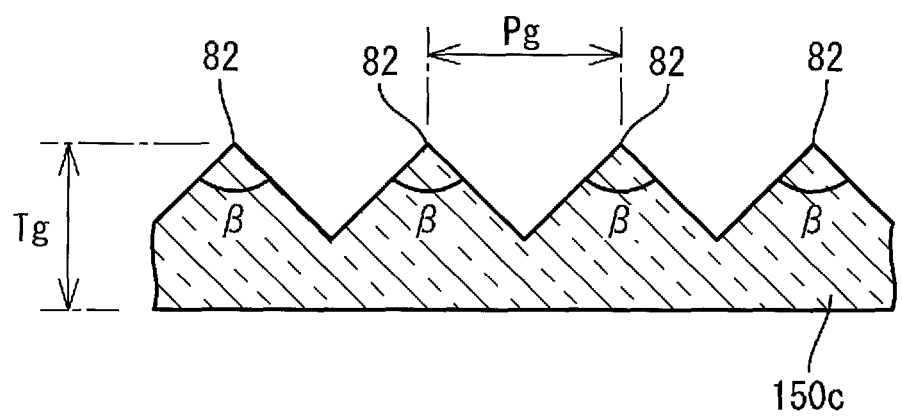
FIG. 11 is a magnified cross-sectional view of a main part of a prism sheet along the short-side direction.
Figure 16:
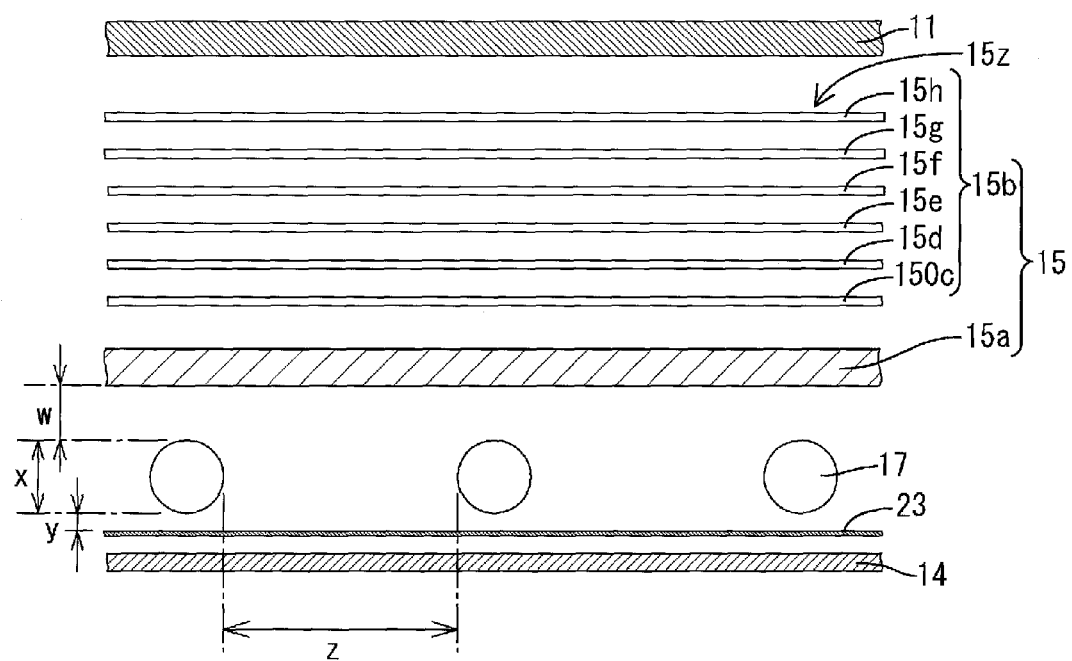
FIG. 16 is an explanatory view schematically illustrating a configuration of a backlight device included in a television receiver according to the second embodiment of the present invention.

The television receiver of the second embodiment includes the backlight device having the optical member 15 illustrated in FIG. 16. The prism sheet 150c illustrated in FIG. 11 is used instead of the lens sheet 15c of the first embodiment. The prism sheet 150c is arranged adjacent to the diffuser plate 15a. This configuration provides the same operational effects as the first embodiment.

FIG. 11 is a cross-sectional view schematically illustrating the prism sheet 150c. The prism sheet 150 includes elongated prisms 82 arranged parallel to each other on the front surface (i.e., the light-exiting surface) of a transparent substrate made of synthetic resin. The prism sheet 150c is arranged such that the longitudinal direction of the prisms 82 is parallel to that of the cold cathode tubes 17. The thickness Tg of the prism sheet 150c is 0.3 mm. The interval Pg of the prisms 82 is 0.05 mm. The vertex angle β of each prism 82 is 90°.

In the television receiver including such a prism sheet 150c, the backlight device 12 included in the liquid crystal display device 10 has the diffuser plate 15a and the prism sheet 150c as parts of the optical member 15. Therefore, the shadows of the cold cathode tubes 17 (i.e., strip shadows) are less likely to be seen on the display screen and thus display with uniform in-plane luminance can be provided. In the backlight device 12, the light emitted from the cold cathode tubes 17 is diffused by the prism diffuser plate 15a and vertical images are created by the prisms 52 on the front surface of the prism diffuser plate 15a. As a result, the shadows of the cold cathode tubes 17 are compensated. Moreover, rays of the light that exit from the prism diffuser plate 15a are separated or collected by the prism sheet 150c having the prisms 82 on the light-exiting surface. As a result, the shadows of the cold cathode tubes 17 are further compensated.

Third Embodiment

Figure 14:
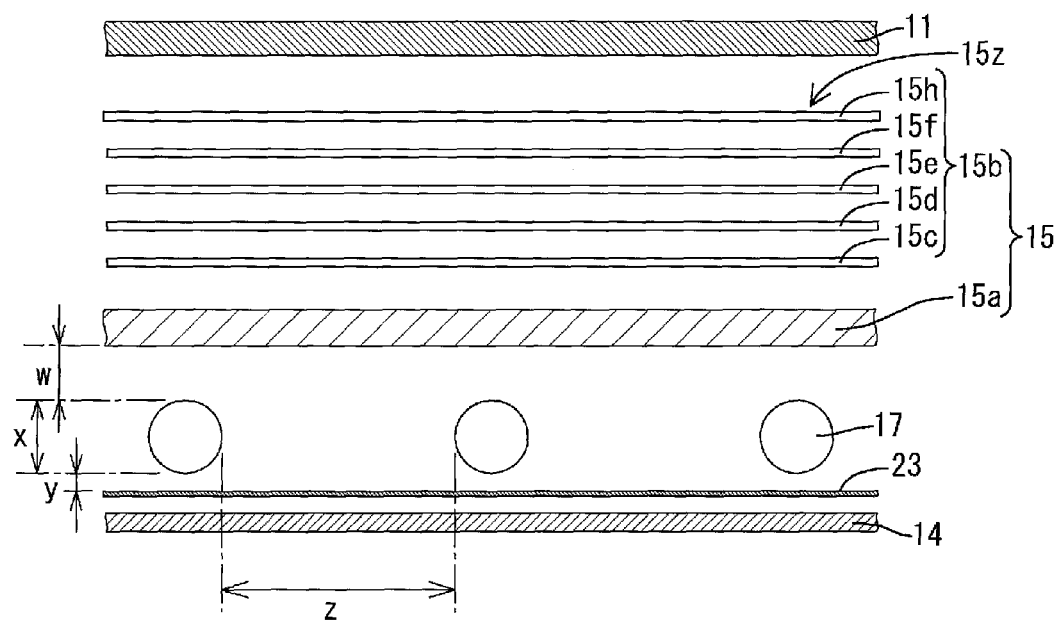
FIG. 14 is an explanatory view schematically illustrating a configuration of a backlight device included in a television receiver according to the third embodiment of the present invention.

In the first embodiment, four diffusing sheets (the diffusing sheets 15d to 15g) are included in the optical sheet set 15b of the optical member 15. However, only three diffusing sheets (diffusing sheet 15d to 15f) may be included as illustrated in FIG. 14. Namely, the lens sheet 15c is arranged adjacent to the diffuser plate 15a and the three diffusing sheets 15d to 15f are layered on the lens sheet 15c. Furthermore, the reflecting-type polarizing sheet 15h is arranged on top of the layered diffusing sheets 15d to 15f.

Fourth Embodiment

Figure 15:
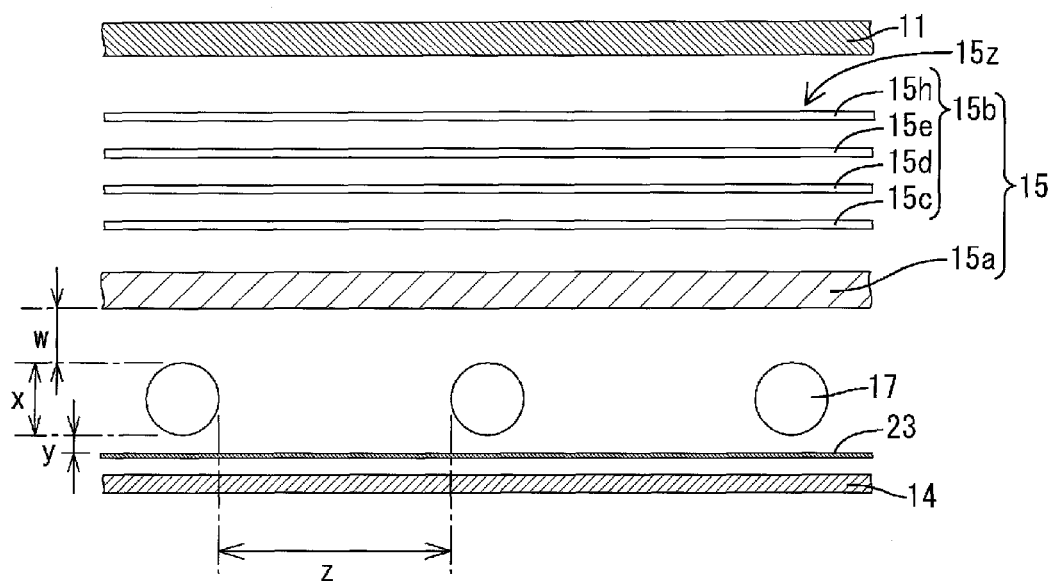
FIG. 15 is an explanatory view schematically illustrating a configuration of a backlight device included in a television receiver according to the fourth embodiment of the present invention.

In the first embodiment, four diffusing sheets (the diffusing sheets 15d to 15g) are included in the optical sheet set 15b of the optical member 15. However, only two diffusing sheets (diffusing sheets 15d and 15e) may be included as illustrated in FIG. 15. Namely, the lens sheet 15c is arranged adjacent to the diffuser plate 15a and the three diffusing sheets 15d to 15e are layered on the lens sheet 115c. Furthermore, the reflecting-type polarizing sheet 15h is arranged on top of the layered diffusing sheets 15d and 15e.

Fifth Embodiment

Figure 17:
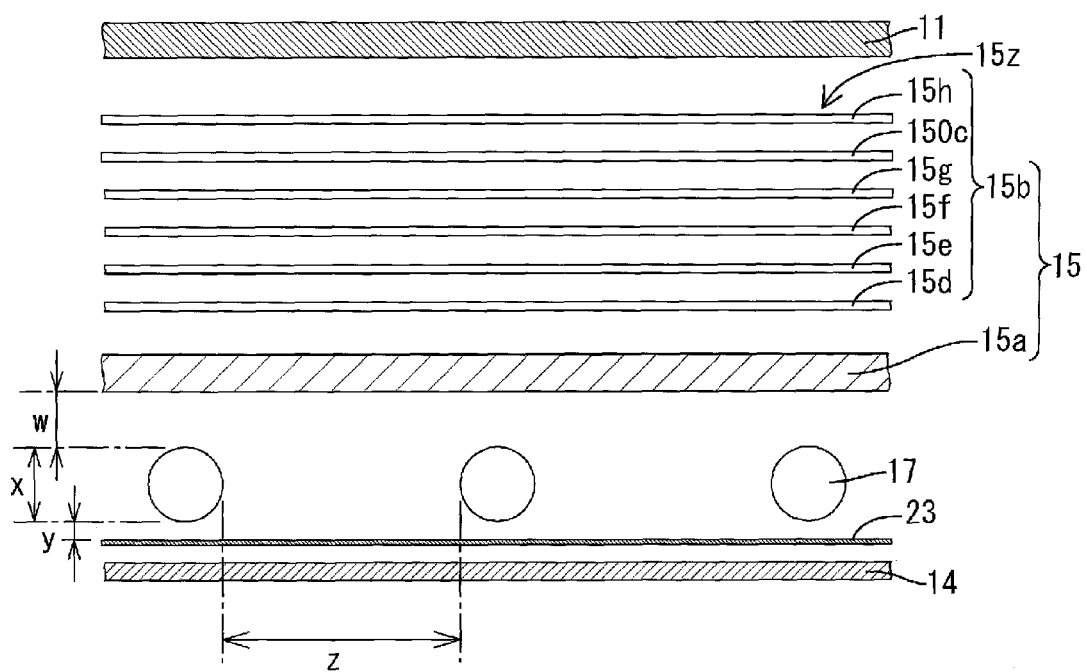
FIG. 17 is an explanatory view schematically illustrating a configuration of a backlight device included in a television receiver according to the fifth embodiment of the present invention.

In the first embodiment, the optical member 15 includes the diffuser plate 15a, the lens sheet 15c, the diffusing sheets 15d to 15g and the reflecting-type polarizing sheet 15h in this order from the cold cathode tube 17 side. However, as illustrated in FIG. 17, the diffuser plate 15a, the diffusing sheets 15d to 15g, the prism sheet 150c and the reflecting-type polarizing sheet 15h may be arranged in this order from the cold cathode tube 17 side.

For the first to the fifth embodiments, verifications of whether or not the shadows of the cold cathode tubes 17 are seen on the display surface are performed, and the following results are obtained.

For the first embodiment, no shadows of the cold cathode tubes 17 are seen even under close observation.

For the second and the third embodiments, the shadows of the cold cathode tubes 17 are slightly seen under close observation. In other words, the display has no deficiency under regular observation.

For the fourth and the fifth embodiments, the shadows of the cold cathode tubes 17 are seen. However, they do not bother the images.

As the first comparison example, the same verification is performed for an optical member including a diffuser plate without prisms on the front surface, a diffusing sheet, a prism sheet and a reflecting-type polarizing sheet layered in this order from the cold cathode tube 17 side. In this comparison example, shadows of the cold cathode tubes 17 are seen and clearly reflected on images.

As the second comparison example, the same verification is performed for an optical member including the diffusing plate 15a, one diffusing sheet 15d, the prism sheet 150c and the reflecting-type polarizing sheet 15h layered in this order from the cold cathode tube 17 side. In this comparison example, shadows of the cold cathode tubes 17 are seen and visibly reflected on images.

In the first to the fourth embodiments, the diffuser plate 15a and the lens sheet 15c (or the prism sheet 150c) are arranged adjacent to each other. With this configuration, rays of light that form virtual images of the cold cathode tubes 17 through the diffuser plate 15a enter the lens sheet 15c (or the prism sheet 150c) without a loss. Therefore, the virtual images can be converted to more preferable virtual images. In the first and the second comparison examples, the diffusing sheet is arranged under the lens sheet (or the prism sheet) as a supplemental light-collecting sheet for the lens sheet. Therefore, the preferable virtual image conversion effect cannot be achieved. Namely, the diffusing sheet is arranged under the lens sheet (or the prism sheet) to improve light-collecting efficiency for increasing the brightness. As a result, the shadows of the cold cathode tubes 17 are less likely to be reduced. In the fifth embodiment, a larger number of the diffusing sheets are provided in comparison to the second comparison example. Although the shadows are still seen unlike the first to the third embodiment, they are compensated so as not to bother the images. Furthermore, the fourth embodiment has a similar configuration to the fifth embodiment but the lens sheet is arranged adjacent to the diffuser plate. As a result, the shadows of the cold cathode tubes 17 are compensated with the smaller number of parts.

Other Embodiments

The present invention is not limited to the above embodiments explained in the above description. The following embodiments may be included in the technical scope of the present invention, for example.

(1) The light sources are not limited to the cold cathode tubes. Hot cathode tubes and other types of discharge tubes can be used.

(2) The diffusing sheet can be provided with a single sheet. Another sheet having 40 to 80% of light reflectivity can be used instead of the diffusing sheet.

(3) The surface of the reflecting-type polarizing film on the light-exiting side is a light-exiting portion of the backlight device (lighting device). However, the light-exiting portion may be provided on a surface of a member that faces the object to be illuminated (e.g., the liquid crystal panel). If an optical sheet such as a diffusing sheet is arranged on the light output side, the surface of the optical sheet on the light output side is a light-exiting portion.

The invention claimed is:

1. A lighting device having a light output portion from which light is output, comprising:
   a plurality of light sources;
   an optical member arranged on the light output portion with respect to said light sources; wherein
   said optical member includes a prism diffuser plate arranged to diffuse light emitted from said light sources and including at least one prism on a surface located on the light output portion, and a lens sheet arranged on the light output portion with respect to said prism diffuser plate and including a convex lens on a surface on the light output portion; and
   the prism diffuser plate and the lens sheet are disposed directly adjacent to each other with no other sheets or elements disposed therebetween.

2. The lighting device according to claim 1, wherein:
   said light sources are linear light sources arranged parallel to each other;
   said prism diffuser plate includes a plurality of elongated prisms arranged parallel to each other such that a longitudinal direction thereof matches a longitudinal direction of said light sources; and
   said lens sheet includes a plurality of elongated convex lenses arranged parallel to each other such that a longitudinal direction thereof matches the longitudinal direction of said light sources.

3. The lighting device according to claim 1, wherein said optical member further includes a diffusing sheet arranged to diffuse light that exits from said lens sheet, said diffusing sheet having a thickness smaller than that of said prism diffuser plate and arranged on the light output portion with respect to said lens sheet.

4. A display device comprising:
   the lighting device according to claim 1; and
   a display panel configured to provide display using light from said lighting device for a display device.

5. The display device according to claim 4, wherein the said display panel is a liquid crystal display panel using liquid crystal.

6. A television receiver comprising the display device according to claim 4.

* * * * *